US012284576B2

United States Patent
Singh et al.

(10) Patent No.: US 12,284,576 B2
(45) Date of Patent: Apr. 22, 2025

(54) AUTONOMOUS MOBILE ROBOT SCALING

(71) Applicant: Intel Corporation, Santa Clara, CA (US)

(72) Inventors: Ruchika Chawla Singh, Chandler, AZ (US); Rita Chattopadhyay, Chandler, AZ (US); Siew Wen Chin, Penang (MY); Sangeeta Manepalli, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 693 days.

(21) Appl. No.: 17/366,099

(22) Filed: Jul. 2, 2021

(65) Prior Publication Data

US 2022/0201441 A1 Jun. 23, 2022

(51) Int. Cl.
*G01C 22/00* (2006.01)
*G06F 9/50* (2006.01)
*H04W 4/06* (2009.01)
*H04W 4/38* (2018.01)

(52) U.S. Cl.
CPC ............ *H04W 4/38* (2018.02); *G06F 9/5005* (2013.01); *H04W 4/06* (2013.01)

(58) Field of Classification Search
CPC ........ H04W 4/38; H04W 4/06; G06F 9/5005; G06F 2209/509
See application file for complete search history.

(56) References Cited

U.S. PATENT DOCUMENTS

| 10,235,642 | B2 | 3/2019 | Kattepur et al. |
| 2015/0106823 | A1 | 4/2015 | Canoy et al. |
| 2016/0354923 | A1 | 12/2016 | Kuffner, Jr. et al. |

(Continued)

FOREIGN PATENT DOCUMENTS

| EP | 3479972 A1 | 5/2019 |
| KR | 1020190086408 A | 7/2019 |

OTHER PUBLICATIONS

International Search Report issued for the corresponding PCT application No. PCT/US2020/066289, dated Sep. 3, 2021, 11 pages (for informational purposes only).

(Continued)

*Primary Examiner* — Adam M Alharbi
(74) *Attorney, Agent, or Firm* — VIERING, JENTSCHURA & PARTNER MBB

(57) ABSTRACT

A robot including a resource sharing circuit, configured to operate according to a resource utilization limit, and comprising a processor, configured to receive resource data representing a resource utilization of the robot; if the resource utilization of the robot is within a predetermined range, operate according to a first operational mode, wherein an upper limit of the predetermined range is defined by a tolerance relative to the resource utilization limit; if the resource utilization of the robot is outside of the predetermined range, operate according to a second operational mode; wherein the first operational mode includes controlling a communication circuit to send a first wireless signal representing an availability to accept a task; and wherein the second operational mode includes controlling the communication circuit to send a second wireless signal representing an availability to allocate a task to an external device for remote processing.

20 Claims, 5 Drawing Sheets

(56) References Cited

U.S. PATENT DOCUMENTS

| | | |
|---|---|---|
| 2018/0039519 A1 | 2/2018 | Kumar |
| 2018/0150085 A1 | 5/2018 | Dey et al. |
| 2018/0276049 A1 | 9/2018 | Kattepur et al. |
| 2018/0326583 A1* | 11/2018 | Baroudi ................. B25J 9/1661 |
| 2019/0373054 A1 | 12/2019 | Kim |
| 2022/0035727 A1* | 2/2022 | Scott, II ................. G06N 20/00 |

OTHER PUBLICATIONS

Extended European Search Report for corresponding application EP 20 967 163.5, dated Sep. 6, 2024, 10 pages (for reference purpose only).

* cited by examiner

AUTONOMOUS MOBILE ROBOT SCALING

CROSS-REFERENCE TO RELATED APPLICATIONS

This application claims priority to PCT Application PCT/US20/66289, filed on Dec. 21, 2020, the entire contents of which are hereby incorporated herein by reference.

TECHNICAL FIELD

Various aspects relate generally to autonomous mobile robot (AMR) scaling and resource-based task allocation for AMRs.

BACKGROUND

AMRs are increasingly utilized for task completion in a variety of contexts. In certain contexts, AMRs may complete tasks faster and/or less expensively than humans. Other tasks may be dangerous to humans and are thus best carried out by AMRs. As AMRs become utilized in a wider variety of contexts, they are being equipped with a greater array of functionalities. Such functionalities may include various degrees of reliance on the AMR's resources, such as, for example, computational resources, sensors, and/or motors. Each such functionality may require, for example, different amounts of processing power, different amounts of sensor utilization, and/or may place different magnitudes of demand on the battery.

These resources are limited. For example, processing power is largely proportional to price, and therefore processors must be selected with a goal of keeping the overall price within an acceptable range. Additionally, AMRs may be under increasing pressure related to form factor, such as the pressure to be increasingly miniaturized. Such miniaturization may have a negative effect on battery power and/or battery longevity, as well as the quantity, type, and the power efficiency of sensors. In light of the constraints, such as those presented by limited processing power, limited battery capacity, and other sensor limitations, it is desired to create strategies to permit AMRs to better carry out their desired functions despite their limited resources.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
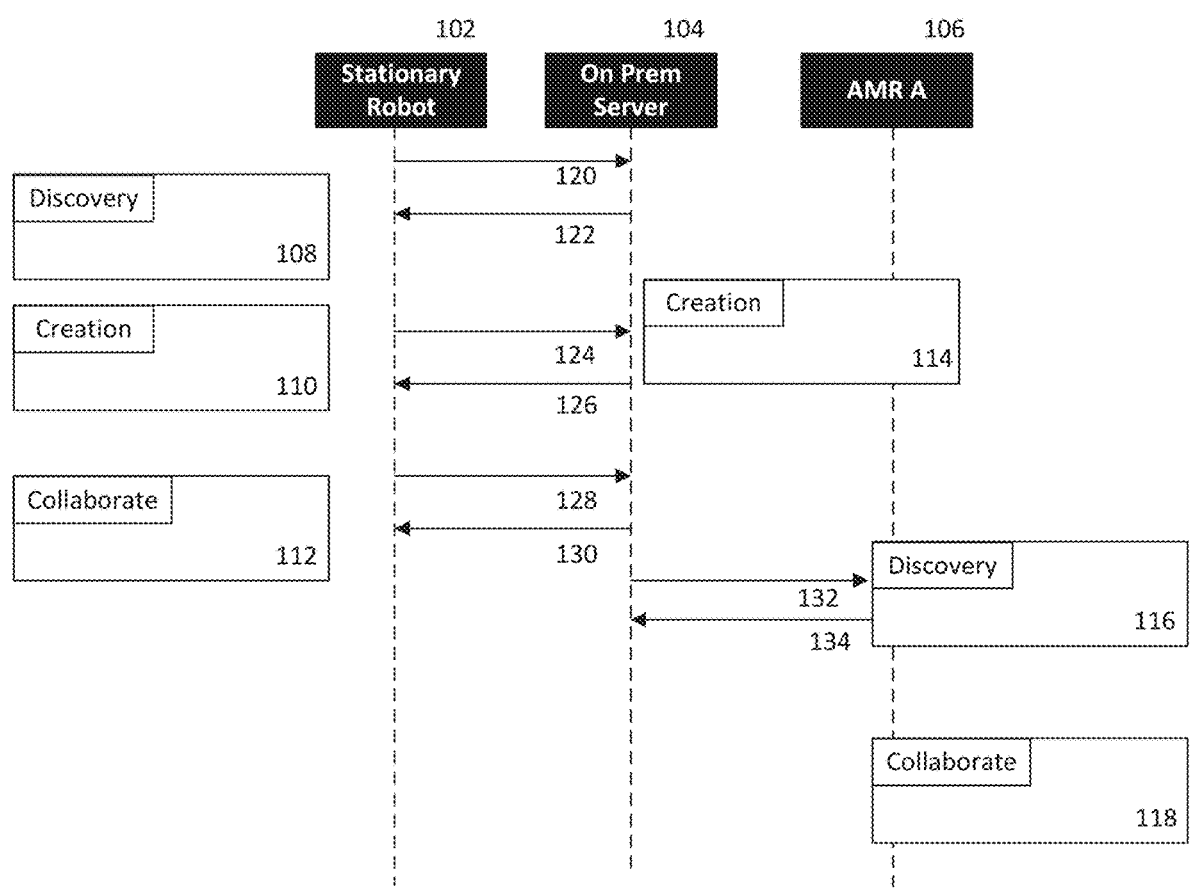
FIG. 1 depicts an example procedure for group formation.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration". Any aspect or design described herein as "exemplary" is not necessarily to be construed as preferred or advantageous over other aspects or designs.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g., "a plurality of (objects)", "multiple (objects)") referring to a quantity of objects expressly refers more than one of the said objects. The terms "group (of)", "set (of)", "collection (of)", "series (of)", "sequence (of)", "grouping (of)", etc., and the like in the description and in the claims, if any, refer to a quantity equal to or greater than one, i.e. one or more.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data," however, is not limited to the aforementioned examples and may take various forms and represent any information as understood in the art.

The term "processor" as, for example, used herein may be understood as any kind of entity that allows handling of data. The data may be handled according to one or more specific functions executed by the processor. Further, a processor as used herein may be understood as any kind of circuit, e.g., any kind of analog or digital circuit. The term "handle" or "handling" as for example used herein referring to data handling, file handling or request handling may be understood as any kind of operation, e.g., an I/O operation, and/or any kind of logic operation. An I/O operation may include, for example, storing (also referred to as writing) and reading.

A processor may thus be or include an analog circuit, digital circuit, mixed-signal circuit, logic circuit, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

Differences between software and hardware implemented data handling may blur. A processor, controller, and/or circuit detailed herein may be implemented in software, hardware and/or as hybrid implementation including software and hardware.

The term "system" (e.g., a computing system, a control system, etc.) detailed herein may be understood as a set of interacting elements, wherein the elements can be, by way of example and not of limitation, one or more mechanical components, one or more electrical components, one or more instructions (e.g., encoded in storage media), and/or one or more processors, and the like.

As used herein, the term "memory", and the like may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa.

Various aspects of the disclosure include references to one or more circuits, such as, for example, a navigation circuit, a communication circuit, a computational circuit, and the like. This specific delineation of functions into these separate circuits is included herein for simplify explanation of the relative functionalities. By describing these circuits separately, however, it is not intended to require that these functionalities be performed on distinct processors or circuits. It is acknowledged that each function attributed to a circuit herein includes one or more processing functions, and said processing functions may be performed on distinct circuits or one or more common (e.g., used for multiple purposes) circuits or one or more common processors.

An AMR is a robot that may include one or more on-board sensors and processors to allow it to autonomously or semi-autonomously perform one or more tasks. AMRs may include a plurality of circuits to assist the AMR in its functions.

An AMR may include a navigation circuit. The navigation circuit may permit an AMR to localize itself within a surrounding environment. The AMR may localize itself through any of a variety of localization procedures. Such procedures may include, for example, reference to an absolute point relevant to the Earth (e.g. Global Positioning System), reference to one or more known reference points (e.g., reference to a plurality of beacons at known locations), or reference to one or more other (moving) robots (e.g., Simultaneous Localization and Mapping (SLAM)). The navigation circuit may permit the AMR to map an environment. The navigation circuit may permit the AMR to navigate through the environment, such as by identifying routes and by selecting a best route from a plurality of routes. The navigation circuit may be configured to recognize one or more obstacles and/or hazards and to plan or modify its route accordingly.

An AMR may include a communication circuit. The communication circuit may be configured to send or receive a wireless signal representing data. The communication circuit may be configured to transmit or receive any kind of wireless signal, including, but not limited to, a radiofrequency signal, an optical signal, an audio signal, or otherwise. The communication circuit may be controlled to transmit and/or receive by one or more processors. The communication circuit may be configured to receive the wireless signal and decode the wireless signal into data, which the communication circuit may then send to one or more processors. The communication circuit may include one or more baseband modems. The communication circuit may include one or more transceivers, which may be configured to transmit and/or receive a wireless signal.

As the demands on AMRs increase, the AMRs' resources become increasingly taxed and restricted. In light of this, it may be desirable to improve efficiency in AMR resource utilization (e.g., to more efficiently utilize processors, sensors, batteries, etc.). Offloading is a promising strategy for improvement of resource utilization, as it permits an over-utilized AMR to engage another AMR to perform one or more tasks. Conversely, offloading allows an under-utilized/over-resourced AMR to accept one or more tasks from another AMR and to perform tasks on this donating AMR's behalf. The utility of such offloading may be increased by determining whether to offload a task or accept an offloaded task based on a profile, which may specify an available resource allowance.

Such an available resource allowance may be referred to herein as a resource utilization limit. The resource utilization limit may be a maximum amount of a limited resource or resources that may be permitted to be used for a given implementation. According to one aspect of the disclosure, a resource utilization limit may be understood as a limit of power utilization (which may be referred to herein as a power usage requirement), such that an existing battery charge will support the AMR's activities for a predefined minimum period (e.g., for 8 hours, for 10 hours, etc.). According to another aspect of the disclosure, the resource utilization limit may be understood as a limit of activities that may be performed (e.g., a maximum threshold for performing an activity, which may be less than a theoretical maximum, for example engaging a navigation circuit at 70% capacity or even disabling the navigation circuit and thereby operating at 0% capacity). Such an understanding of the resource utilization limit is described herein in conjunction with the power usage requirement because a limit on use of a resource (e.g., limiting processing power, limiting motor operation, limiting sensor operation, etc.) may translate directly into a limitation of power consumption and therefore have a closely related effect on battery longevity, duration of operation from an existing charge, and the like.

Aspects of this disclosure describe mechanisms for AMRs to share tasks for improved efficiency, failsafe operation, and/or to meet power usage requirement (for example, a requirement for battery life). Using these mechanisms, the AMRs may collaborate by forming dynamic clusters with other intelligent agents, such as while moving within indoor or outdoor environments. This may allow AMRs to dynamically scale their hardware platform resources (e.g., computational resources and sensors). This scaling of resources may be subject to one or more service level agreements and/or connectivity QoS with peer agents.

An AMR may include one or more modular components, which may be separate or physically isolated. Alternatively, two or more components described herein may be combined in a single circuit or chip. That is to say, the one or more processors that control offloading may also control one or more other functions (e.g., navigation, mapping, sensor interpretation, motor control, etc.). Regardless of how they are organized, the components may interact to provide the AMR's intended functionality.

According to an aspect of the disclosure, the AMR may be equipped with a compute module (e.g. a module for computational processing, for example, a module including one or more processors), an inference module, a motion module, and/or a sensor module.

The compute module may provide localization or path planning for the system. The sensor module may control and/or provide an interface to one or more sensors (e.g., positioning sensors, image sensors (camera, LiDAR, radar, etc.), etc. The motion module may control one or more motors for AMR mobility and/or for movement of one or more parts of the AMR (e.g., one or more robot appendages, one or more robot arms). The inference module may provide perception or object analytics for understanding of the environment in which the agent operates. Other modules may include the communication circuit and/or one or more manageability modules.

The AMR system may provide the ability for a platform to specify intended functionality per modular component. The hardware and associate software may in this case provide the ability to identify associated performance and power usage requirements (for example, battery life constraints).

According to an aspect of the disclosure, the AMR may operate according to one or more task profiles. A task profile may be associated with one or more AMR functionalities, such as, for example, navigation, perception, analytics, mobility, mapping, or otherwise.

The task profile may be associated with a task of the AMR and/or be selected based on one or more assigned tasks of the AMR. Given the diversity of AMR implementations, not to mention the ever-increasing number of AMR-uses, AMRs may be assigned to carry out any, or any combination, of a wide-variety of tasks. For example, it is known to utilize AMRs for physical moving/relocation of items (e.g. moving of palettes, such as in a warehouse); assembly of items (e.g., such as in a manufactory); sorting of items (e.g., in post or clearinghouse); cleaning (e.g., in an industrial or residential setting); navigation (e.g., as a beacon and/or as a navigator, such as performing a SLAM algorithm). Each of these general activities may be associated with different demands in terms of sensor usage, motor usage, and/or computational demands (e.g. compute module demands and/or inference module demands).

The task profile may be associated with one or more power usage requirements (e.g., power usage goals). Since AMRs are mobile, they are generally untethered from fixed power sources and are thus primarily battery-reliant. AMRs may be required to perform tasks for lengthy periods and thus require longevity of battery-charge and/or a predictable period of operation with a given battery charge. For example, it may be necessary that an AMR, once placed into duty, be operational for a period of hours (e.g., the AMR must operate for at least 5 hours, for at least 8 hours, for at least 10 hours, etc.).

The various tasks may be associated with different power usage requirement (e.g. different demands upon the battery resources). For example, and merely for demonstrative purposes, operation of motors may be associated with considerable battery usage, which may be greater than the battery usage associated with operation of some sensors, which may be greater than the battery usage associated with the operation of some navigation computations, which may be greater than the battery usage associated with the operation of some basic processing demands. It may be the case that a power usage requirement (e.g., a goal for power usage) and/or a minimum operational duration of a battery may be unattainable or unlikely to be attained without limitations on the various tasks, or the magnitude of processing resources (e.g., the percent of processing capacity overall, the percent of processing capacity useable for a certain task, etc.). As such, a task profile may be associated with one or more limitations in circuit usage, one or more limitations in activities/tasks, one or more limitations in processing activities, and/or one or more limitations in sensor operation, one or more limitations in motor operation. According to an aspect of the disclosure, these one or more limitations may be implemented to assist the AMR in meeting a power usage requirement.

The following table illustrates, by way of example, sample robotic agent task profiles, associated modules, and utilization samples, and consequently resultant battery life expectations. These sample task profiles may allow identification of robots in a given vicinity for offloading services and/or allow for on-system monitoring of resource usage on a given system.

| Task profile | Functionality | Modules and associated utilization | Battery Life/ Uptime |
|---|---|---|---|
| Task profile 1 | Navigation (Localization, mapping), Perception, Mobility, Analytics Full Functionality | Compute module 100% Sensor module 100% Motor module 100% Inference module 100% | 8 hours uptime |
| Task profile 2 | Navigation (Localization only), Perception, Mobility, Analytics Mapping not included | Compute module at 70% capacity Sensor module at 100% capacity Motor module 100% Inference module 100% | 9.5 hours uptime |
| Task Profile 3 | Navigation, Mobility, Perception, Analytics leveraged from peers | Compute module at 100% capacity Sensor module at 100% capacity Motor module 100% Inference module 0% | 10 hours |
| Task Profile 4 | Mobility, limited Perception, Follow me Profile | Compute module at 30% capacity Sensor module at 30% capacity Motor module 100% Inference module 0% Perception 30% | 16 hours uptime |
| Task Profile 5 | Navigation, Analytics, Mobility, Shared sensors profile | Compute module at 70% capacity Sensor module at 30% capacity Motor module 100% Inference module 100% Perception 30% | 10 hours |

This figure depicts five sample task profiles, which may be associated with different tasks. Task profile 1 includes navigation, perception, mobility, and full analytics functionality, in which each module is able to be utilized at 100%. According to an aspect of the disclosure, this may be appropriate in situations in which the AMR may act independently, in which the AMR is unable to offload tasks to other AMRs, in which it is impracticable for the AMR to offload tasks to other AMRs, and/or in which the power usage requirement (e.g. desired battery life/operating time from a single charge) may be reliably met.

In contrast to task profile 1, task profile 2 reflects a more demanding power usage requirement (e.g. a longer duration of required battery usage for a charge) and thus a corresponding reduction in modules and/or utilization. In this manner, the compute module is limited to 70% capacity. Thus, an AMR operating according to task profile 2 whose tasks may otherwise exceed 70% of its compute model's capacity may be a candidate for task offloading, as will be described in greater detail herein.

Further describing the task profiles, task profile 3 is another alternative task profile configuration in which the power usage requirements are further extended (in this case, from the 9.5 hours of task profile 2 to 10 hours of battery usage). To permit this power usage goal, and corresponding to the particular task configuration and/or the ability to offload, the modules and associated utilization are configured such that each module may operate at 100% capacity, except for the inference module, which in this case is disabled or is permitted to operate only at 0% capacity. In this manner, inference module tasks may be offloaded, as will be described in greater detail herein. The limitation associated with the inference module may be associated with power saving and thus assist the AMR in satisfying its power usage requirement of 10 hours of operation in a single charge.

Task profile 4 and task profile 5 depict alternative task profile configurations, representing various configurations of modules to reach different power usage requirements. In light of the above descriptions of task profiles 1-3, the depictions of task profiles 4 and 5 are self-explanatory.

It is noted that the task profiles depicted herein are shown as examples for demonstrative purposes only and are not intended to be limiting. An AMR may be configured with fewer or more than 5 task profiles, as desired for a given implementation. For example, the number of task profiles may be 2 or more, 5 or more, 10 or more, 20 or more, 50 or more, 100 or more, etc. As depicted herein, each task profile may be associated with one or more tasks (second column in the table) that the AMR is assigned to perform. For example, an AMR performing a restocking activity may be required to perceive an environment (e.g. such as with one or more sensors), navigate through the environment, and operate motors for locomotion and movement of items. On the other hand, an AMR may operate with a limited number of predetermined paths between destinations, thereby rendering much of the function of the navigation circuit (e.g., obstacle recognition, path determination, etc.) largely moot. Tasks for which the AMR is not responsible may be omitted from the task profile. With respect to the above example, the task profile could omit navigation or one or more navigation sub-functions from the task profile, as the AMR would not be required to perform such tasks/sub-functions.

According to an aspect of the disclosure, the AMR may include a telemetry circuit, which may be configured to monitor the battery status and resource usage of the AMR. By virtue of this monitoring, the telemetry circuit may determine whether the AMR is able to meet its power usage requirements and/or whether it was able to perform a given task in light of any limitations within its task profile. If a task profile limitation precludes the AMR from performing a task, the AMR may be configured to determine whether the task could be offloaded and consequently whether one or more devices (e.g. one or more devices in the AMR's vicinity, one or more servers, one or more cloud computers, or any combination thereof) may accept the offloaded task. According to an aspect of the disclosure, the possible devices, robots, servers, cloud computers, etc. to which a task may be offloaded may be saved in a local storage (e.g. in a local database). Said objects in the local storage may be understood as trusted objects.

According to an aspect of the disclosure, the AMR may be pre-configured (e.g. user-configured, assigned by a central system, assigned by another device, etc.) with a given task profile. That is, the AMR may receive an instruction from an external source to operate according to one of one or more predetermined task profiles. Alternatively or additionally, the AMR may receive an instruction to operate according to a customized task profile, in which case the AMR may receive with said instruction at least one or more limitations on resources. According to an aspect of the disclosure, such one or more limitations may include or resemble any of the limitations in the third column of the table above. In this manner, the AMR may generate a new task profile based on the received instruction. The AMR may include a memory in which this profile (or any profile disclosed herein, whether predetermined, newly-generated, or otherwise) is disclosed.

According to an aspect of the disclosure, the AMR may be configured to self-select a task profile from a plurality of task profiles. That is, the AMR may be configured with one or more predetermined task profiles, which may be locally stored and/or which may be remotely stored in a manner to which the AMR has access. The AMR may include one or more processors, which may be configured to determine one or more tasks, which the AMR is required to perform, and to select a task profile from the one or more task profiles based on the one or more required tasks. Alternatively or additionally, the AMR's one or more processors may be configured to select a task profile from the one or more task profiles based on a power usage requirement or necessary duration of duty with a battery charge. For example, an AMR assigned to perform one or more cleaning tasks may determine the necessary modules (e.g. navigation, obstacle recognition, motors) to perform the cleaning tasks, and then may select a task profile accordingly. As part of the task profile selection, the AMR may consider that it is required to perform the cleaning task for a specific duration (e.g. for a period of eight hours, for a period of ten hours, etc.), and it may select a task profile to account for the necessary modules for the tasks to be performed and/or the specific duration. For example, to perform the necessary cleaning tasks there may be a plurality of potentially acceptable task profiles (e.g. task profiles that permit the necessary modules to be used). Of these plurality of potentially acceptable task profiles, the task profiles may have differing utilization of modules and thereby differing power usage requirements (e.g., battery life/uptime). The one or more processors may, in this case, be configured to select a predetermined task profile from the one or more potentially acceptable task profiles based on an additional factor, such as, for example, a power usage requirement (e.g. the necessary battery life/uptime).

The one or more processors may be configured to determine the power usage requirement based on one or more tasks that the AMR is required to perform. That is, in a given implementation, certain tasks may be associated with a particular duration of service between charges. For example, it may be the case that all inventory shifts last eight hours without battery charging, whereas all cleaning shifts last only six hours without battery charging. Alternatively or additionally, and by way of example, it may be the case that all restocking tasks last ten hours but permit as many as two charges during this period. As such, and in light of these varying factors (e.g. duration of shift relative to task, availability of charging, etc.), the one or more processors may be configured to determine the necessary power requirement. With a necessary power requirement having been determined, the one or more processors may be configured to select a task profile, such as a task profile of the one or more task profiles.

According to an aspect of the disclosure, the AMR may be configured to iteratively select a task profile from the one or more task profiles. That is, the choice of a task profile may permit and/or prompt offloading of one or more tasks. However, the ability to offload one or more tasks may be dependent on factors outside of the control of the particular AMR. As such, the AMR may find itself unable to meet its power usage requirement (e.g. required duty on its current battery charge) using its current task profile. In such circumstances, it may be required to select an alternative task profile (e.g. a task profile with greater overall restrictions and/or a task profile with restrictions that may otherwise foster offloading given the current environment). In this manner, the task profiles may be iteratively selected, such as to successively increase or change restrictions to meet a power usage requirement.

According to an aspect of the disclosure, the AMR may be configured to generate one or more task profiles. It may be the case, for example, that no task profile of a plurality of predetermined task profiles is likely to meet the power usage requirement in light of the given task. Where none of the plurality of predetermined task profiles are sufficient, or where it is otherwise desirable to generate a new task profile, the one or more processors of the AMR may be configured to generate one or more additional task profiles (e.g. so as to meet a given power usage requirement). For example, the plurality of predetermined task profiles may not contemplate the necessary functionalities for a given AMR assignment, thereby necessitating the generation of an additional task profile. Alternatively or additionally, the plurality of predetermined task profiles may not correspond to a necessary power usage requirement/battery requirement, thereby necessitating the generation of an additional task profile. In so generating an additional task profile, the one or more processors may generate all aspects of the task profile or may generate some aspects of the test profile and receive one or more other aspects of the task profile in the form of instructions, such as from an outside entity.

According to an aspect of the disclosure, the AMR may include one or more artificial intelligence circuits, which may be configured to select and/or generate one or more task profiles. Such artificial intelligence circuits may be trained using any of historical task selection data, historical task profiles, historical battery life data, their corresponding historical module usage and functionality, or any combination thereof. Such artificial intelligence circuits may be trained to select a task profile from a plurality of task profiles in light of a given task, one or more given functionalities, one or more restrictions or limitations on modules and associated utilizations, and/or one or more power usage requirements (e.g. power usage goals). Such artificial intelligence circuits may be any kind of artificial intelligence circuits, including, but not limited to, an artificial neural network, and artificial convolutional neural network, a supervised learning circuit and unsupervised learning circuit, or otherwise.

According to an aspect of the disclosure, the one or more processors may be configured to select (whether a first selection or an iterative selection) a task profile based on at least telemetry data. As described herein, the AMR may include a telemetry circuit, which may be configured to receive sensor data from one or more sensors. The sensor data may provide, or may be used by the one or more processors to determine, the utilization of the sensors/a power usage requirement associated with the sensors or the utilization. The telemetry circuit may be configured to determine the utilization of one or more processors. The telemetry circuit may be configured to determine battery data/charge data (e.g. a battery voltage, and amount of current drawn from the battery, a total charge (e.g. a total number of Colombes) received from the battery), and the telemetry circuit and/or the one or more processors may be configured to determine a remaining charge and/or a remaining time at the current or expected usage before a subsequent battery charging is required.

According to an aspect of the disclosure, offloading of one or more services may require a level of trust between the AMR and the device to receive an offloaded task. Such minimum levels of trust may be required, at least to ensure the performance of the activity and/or to protect the integrity of data, the tasks/mission, and any other AMRs. Tasks or services may specify associated parameters for service level agreements (SLA) and enlist associated parameters for operation. For example, a robot may publish a path planning service within certain area restrictions and latency guarantees. As a robot agent traverses, its associated area of service may be modified or the latency guarantees may update as it changes its task profiles to be more computationally expensive.

The following table includes sample services and their associated parameters with SLAs that may be published.

| Services category | Parameters | SLA |
|---|---|---|
| Navigation based services, e.g Path Planning | Area/Zone of operation, | Latency, Service duration |
| Perception based services, Object Analytics | Area/Zone of operation | Latency, Service duration |
| Scene Understanding based services: Traffic updates, anomaly updates like spills | Area/Zone of operation | Service duration |
| Sensor based services | Sensor parameters - resolutions, area coordinates | Sensor sample rate, service duration |

In greater detail, an AMR may advertise availability to perform any of a variety of services. A non-limiting list of examples of such services is included in the "services category" column, above. The AMR may be configured to send one or more parameters associated with such services. These parameters may represent additional information that may be useful for a receiving device (e.g., a device to which the task will be offloaded) to determine whether it may in fact receive and perform the task, such as, for example, based on its location, its available sensors, it processor limitations, etc. According to an aspect of the disclosure, the AMR may agree on one or more SLAs associated with the services. For example, certain application level SLAs may be in place, such as response time, depending on latency of system performance metrics such as accuracy of detection, which has bearing on compute and memory requirement of the AMR. Hence, in order for another robot to accept or reject the request, such information may be necessary so that the SLA is met at the application level. The AMR may also advertise the service duration as part of the SLA, which may assist the receiving device in making offload decisions. Similar to response time, sampling rate can also be another SLA, the sampling rate may also depend on environment parameters such as lighting, speed of vehicle, etc. It may be preferred for the agreed SLA to meet the requirements of the receiving device and that, which the delivering device is capable of delivering.

According to an aspect of the disclosure, tasks may be offloaded within an established group. FIG. 1 depicts an example procedure for group formation. In this example, a stationary robot 100 into may communicate with an on-premises server 104 for group creation. An AMR 106 (the bold for specificity in this figure as "AMR A") may also join the group for task offloading/receipt of offloaded tasks. In this manner, the stationary robot 102 may perform a discovery operation 108, such as by sending a discovery message 122 and on-premises server 104. The on-premises server 104 may respond with a confirmation message 122. Having received confirmation, the stationary robot 102 may perform a group creation operation 110, in which the stationary robot 102 creates a group ID (e.g., For demonstrative purposes "GroupFactoryFloor1"), identify and allocate its role, such as an authenticator, and publish available services with its SLA. This information may be transferred to the on-premises server in a message such as in 124 the on-premises server 104 may perform a creation exercise 114, in which it acknowledges the group and the role, and publishes available information within the SLA. This may be sent in a message such as 126. The stationary robot and/or on-premises server may then perform a collaboration operation 112, so as to permit one or more services to be offloaded. In this manner, the stationary robot 102 may be subscribed to operation services and may adjust its internal work profile accordingly. This may be achieved through communication with the on-premises server 104 as shown in request 128 and response 130. The on-premises server may perform a discovery operation 116 with another AMR 106, such as when the AMR discovers and joins the group (e.g. GroupFactoryFloor1), at which time the AMR may be authenticated by the authenticator and may publish it services. This may be achieved through communication from the on-premises server 104 to the AMR 106 as depicted in 132 with a corresponding response from the AMR 106 as depicted in 134. In this manner, the AMR may perform a collaboration operation 118 in which the AMR is subscribed to the stationary robot services with an agreed SLA and may adjust its internal work profile accordingly.

The communications profile depicted herein is provided for demonstrative purposes and is not intended to be limiting. Rather, it is generally understood that a plurality of stations (including but not limited to any of AMRs, stationary robots, servers, cloud computers, workstations, or otherwise) may be joined within a common group. The group may be defined, for example, by a common purpose, such as all devices for cleaning and area, all devices for performing inventory on a given shift, all devices for transporting goods within a given timeframe, all devices for assembly of a product, etc. The group may be defined by uniformity of purpose. The group may be defined by performance of contemporaneous actions, such as a common shift, a common time period, a common battery charge duration, etc.

Figure 2:
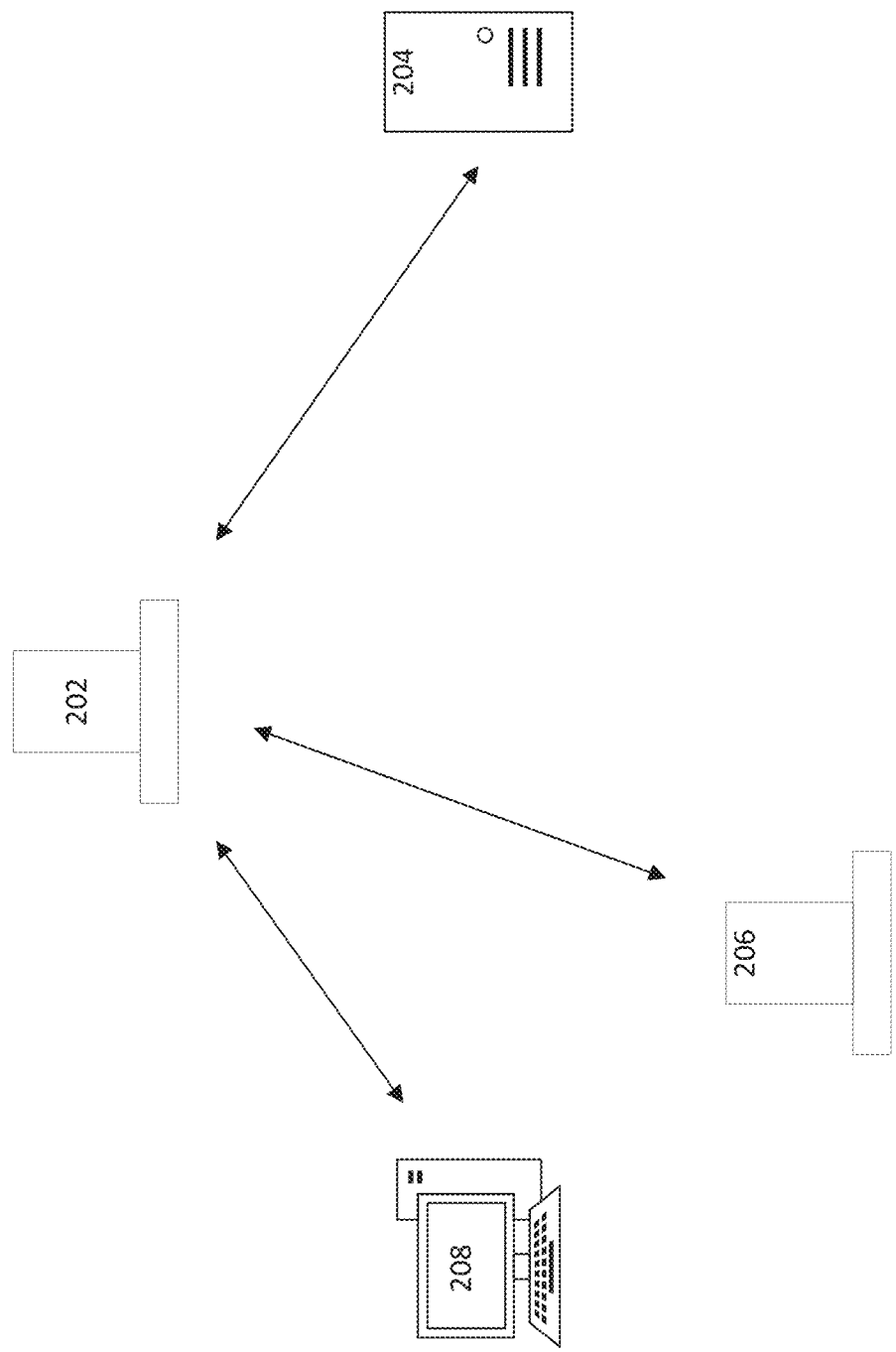
FIG. 2 depicts a group discovery, according to an aspect of the disclosure.

FIG. 2 depicts a group discovery, according to an aspect of the disclosure. In this figure, four devices are depicted: a first AMR 202, a server 204, a second AMR 206, and a stationary computer 208. Each device may be configured to send one or more task profiles and/or services to one or more other devices. Such transmissions may be device-to-device or broadcast. In this case, and for demonstrative purposes, the first AMR may broadcast its task profile (e.g. its assigned tasks), which may illustratively include WP12, WP23, and WP33, and its exposed services S13 SLA 1, and S23 SLA2.

The exposed services can be use case or functions that an AMR is capable of performing. The services may be generic to the AMR operation and/or may be specific to the environment in which the AMR is operating. Hence, the exposed services may represent the specific task that an AMR or a set of AMRs are targeted to achieve. Generic services may include functions such as path planning, navigation from a specific source to a destination or receiving sensor perception information to augment its own perception capabilities. These services may be used by the receiving AMR, such as by augmenting its operation or switching to an optimal profile for example by conserving its compute and consequently its battery requirements. Specific use case based services may include monitoring traffic density in a specific indoor area, monitoring oil spills, or monitoring other anomalies in a defined environment. Exposed services may be understood as functions that are required from any subscribing robot.

In response, remaining devices 204, 206, and 208 may respond with their task profiles and/or exposed services. Illustratively, the server 204 may respond with task profile WP12, WP22, and WP32, and exposed services S12 SLA1, and S22 SLA2. The second AMR 206 may respond with task profile WP11, WP12, and WP31, and with exposed services S11 SLA1, and S21 SLA2. The stationary computer 208 may respond with task profile WP13, SP23, and WP 33, and with exposed services S13 SLA1, and S23 SLA2. Again, these are provided by way of example for demonstrative purposes only. The first AMR 202, having received these task profiles and exposed services, may determine whether one or more devices may be suitable to accept a task and/or perform a service and may correspondingly advertise/offer one or more tasks and/or services for offloading. Conversely, the AMR 202 may determine that one or more tasks and/or services of the other stations may be acceptable for the AMR 202, and the AMR 202 may advertise a willingness to accept the one or more tasks or services for performance.

Upon receiving a task, the receiving station/AMR may perform the task and may communicate a result of the perform task to the offloading station. For example, and with reference to the elements of FIG. AMR 202 may receive data from its telemetry circuit that its battery charge is likely insufficient to operate for the remainder of its required duty cycle/shift. Upon receiving this information, AMR 202 may iteratively select an alternative task profile, in which one or more resources are (additionally) restricted. This restriction may require that the AMR 202 offload one or more tasks. In performing the communication as described above, the AMR may select one or more stations to which it may offload one or more tasks. The corresponding station (server, stationary robots, other AMR, etc.) may accept the task, perform the task, and transmit a result of the perform task to the AMR 202. In this manner, the AMR 202 has the results of the task, without the power expense of having perform the task itself. Illustratively, the AMR 202 may offload any of its own tasks including, but not limited to, transporting an object, restocking a supply, otherwise operating one or more motors, performing one or more environmental perception operations (e.g. via sensors and processing of sensor data), performing one or more navigation operations (e.g. determining a route from one location to another location), performing one or more object recognition activities, performing one or more computational operations, etc.

The members of a group may share a common administrator, a common task assignor, a common manufacturer, a common owner, or any other common features so as to unite the members within a group. Group membership may be useful and/or necessary to ensure security within the operations. That is, data involved in performing one or more AMR tasks may be proprietary or secretive, or it may otherwise be unwise to share said data with unknown or unaffiliated AMRs. As such, uniformity of administrator, uniformity of task assigning entity, etc. may provide a common basis of trust with which to form a group identity.

According to another aspect of the disclosure, group identity may be formed entirely or in part by virtue of common SLAs. In this manner, one or more AMRs not sharing the common features listed above for group membership may join the group once a SLA is in place. According to an aspect of the disclosure, it may be possible to establish an SLA as part of a financial transaction. For example, one or more AMRs of the first group may exhibit a need to offload one or more tasks. In this hypothetical example, an insufficient number of devices (e.g. other AMRs, servers, cloud computers, etc.) may be available for receipt of offloaded tasks. One or more AMRs of a second group, not otherwise affiliated with the first group, may engage in a financial transaction to establish group identity for purposes of receiving offloaded tasks. In this manner, one or more AMRs of the first group (e.g. whether by the AMRs themselves, a group owner, a group administrator, or otherwise) may purchase participation of the one or more AMRs of the second group, such that the one or more AMRs of the second group receive offloaded tasks. In so purchasing, the first group and the second group may establish an SLA sufficient to generate the necessary trust for group membership.

An AMR may offload one or more tasks to one or more other AMRs, one or more servers, one or more stations (e.g., PCs, mainframes, portable devices, wearable devices, laptops, tablet computers, or the like), one or more cloud-based servers, or any other device capable of performing the necessary task.

In some cases, the offloaded task may be purely or principally computational in nature. Such tasks may be performable (e.g., may be calculated) by any nearly any entity with one or more processors. In this situation, (raw) data for the computation may be transmitted (e.g., via the communication circuit) to the receiving device, which may then process the (raw) data in an appropriate fashion. For example, an AMR's sensor data representing a vicinity of the AMR may require one or more robust computational calculations to localize and/or navigate. Based on the task profile, the AMR may be unable to perform such a calculation. In this case, it may be power saving to simply transmit the data and await a response including localization information and/or navigation information. In this manner, such robust computations may be offloaded as a power saving matter. As a general matter, such calculations may be performed on-site or remotely. Under some circumstances, these tasks may be performed by one or more devices that are not dependent on a battery (e.g., devices connected to a mains voltage).

In other cases, the offloaded task may require one or more aspects to be performed on-site. For example, tasks involving sensor perception of an environment of the AMR may, in some circumstances, only be offloadable to another device in a vicinity of the AMR. Similarly, should it become necessary for the AMR to offload one or more tasks involving motor control (e.g., moving of an object, travelling to another location, etc.), this may limit the set of devices that may receive such an offloaded task to devices that are within a vicinity of the AMR.

The offloading AMR may be configured to send the necessary data for performing the task to the receiving device. The necessary data may be task-specific and therefore a complete description of same will not be included herein. Rather, it is stated that many AMR tasks may be communicated within a relatively limited number of parameters. Although the communication of the task may not be especially power-demanding, the performance of the task may require significantly more power resources. The following examples are provided for demonstrative purposes:

| Task Parameter | Task Performance |
| --- | --- |
| Send sensor data (e.g. image data) | Perform object detection and navigation. |
| Send data representing received wireless signals from a plurality of beacons | Localize relative to the beacons |
| Send data representing received wireless signals at multiple sampling times | Localize via a SLAM routine |
| Send pickup and dropoff location information | Travel to pickup, accept object, and move object to dropoff location |
| Send location information defining a surface area. | Clean surface area. |

As can be seen, sending such a task parameter may generally require fewer power resources than performing the task. In this manner, the AMR may offload tasks and thereby achieve a power savings.

Communications between AMRs and/or communications between AMRs and other members (e.g. one or more stationary robots, one or more servers, one or more cloud computers, etc.) may be performed using any mutually understandable language and/or protocol. According to an aspect of the disclosure, such communications may be achieved using The Robot Operating System 2 (ROS2). ROS2 may be generally understood as an open source set of libraries and tools which may be used in a variety of robot applications. According to an aspect of the disclosure, ROS2 may be utilized for group building, robot to robot communication, robot to group communication, offloading of tasks, acceptance of offloaded tasks, or otherwise.

Figure 3:
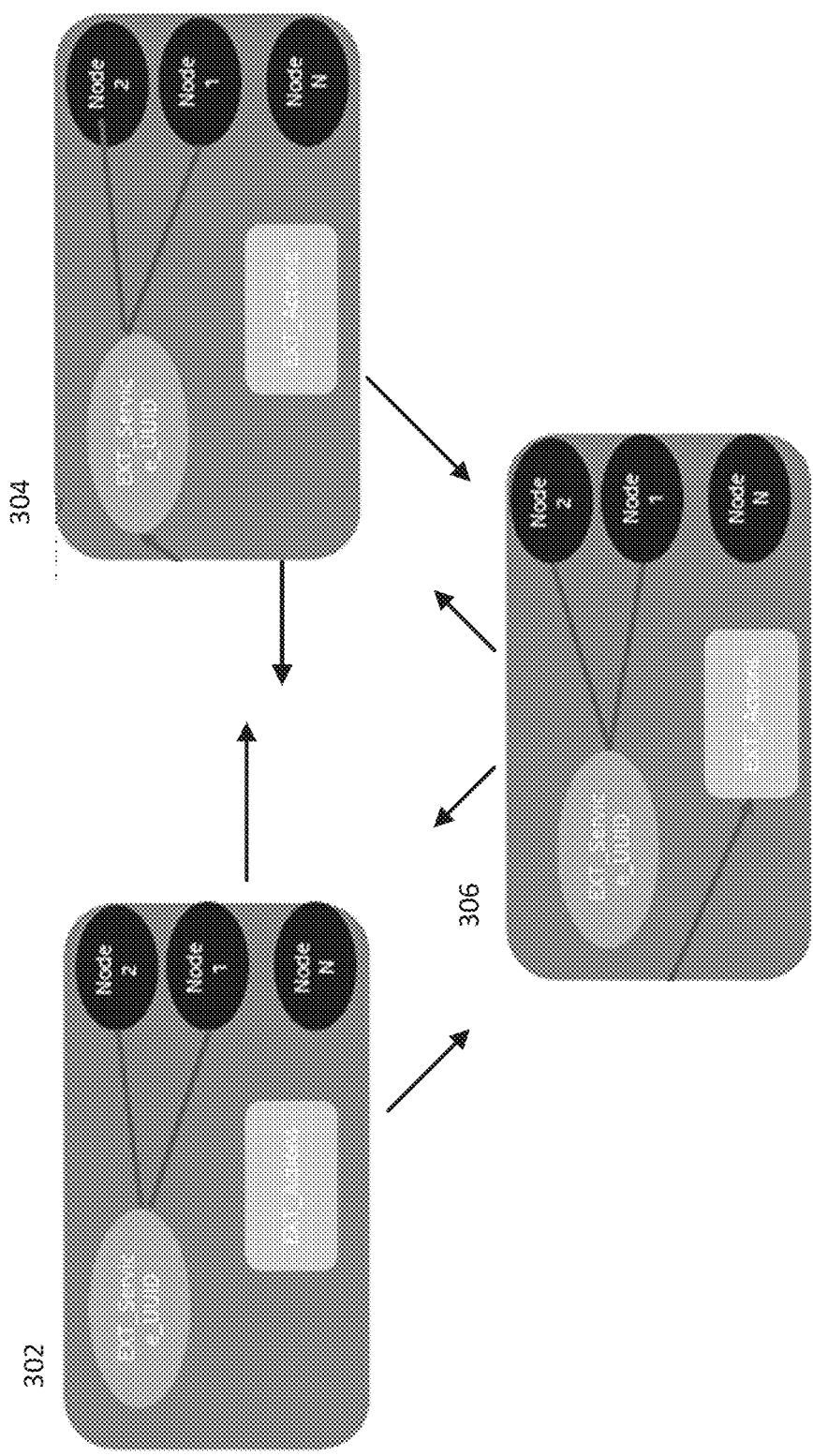
FIG. 3 depicts a utilization of ROS2.

FIG. 3 depicts a utilization of ROS2 for the communication disclosed herein. In this example, tasks and services may be exposed by using ROS2 framework. A new Service may be created with the prefix EXT, which may allow for broadcasting of the task profiles. This may be performed, for example, at regular periodic intervals. A new action type may be created with the EXT prefix that allows for nodes to offload specific functionality or services to other robots to conserve energy. Results from this execution may then be provided to the robot that made the request.

According to an aspect of the disclosure, the service may be formulated as:

EXT_Service_UUID= wherein this service represents a new ROS2 service that is able to support a task profile broadcast. In FIG. 3, Robot 1 302 and Robot 2 304 are depicted as sending a periodic message to one or more nodes. As described above, this may optionally be performed using the EXT-Service_UUID extension. These transmissions may include task profile information, a list of available services, a list of available actions, or any combination thereof.

According to another aspect of the disclosure, a new action type may be formulated as:

EXT_Actions= wherein this service represent a new ROS2 Action type in ROS2 to support services or workload offload from one robot to another. In this figure, Robot 3 306 is depicted as sending an action to offload to one or both of Robot 1 302 and Robot 2.

Figure 4:
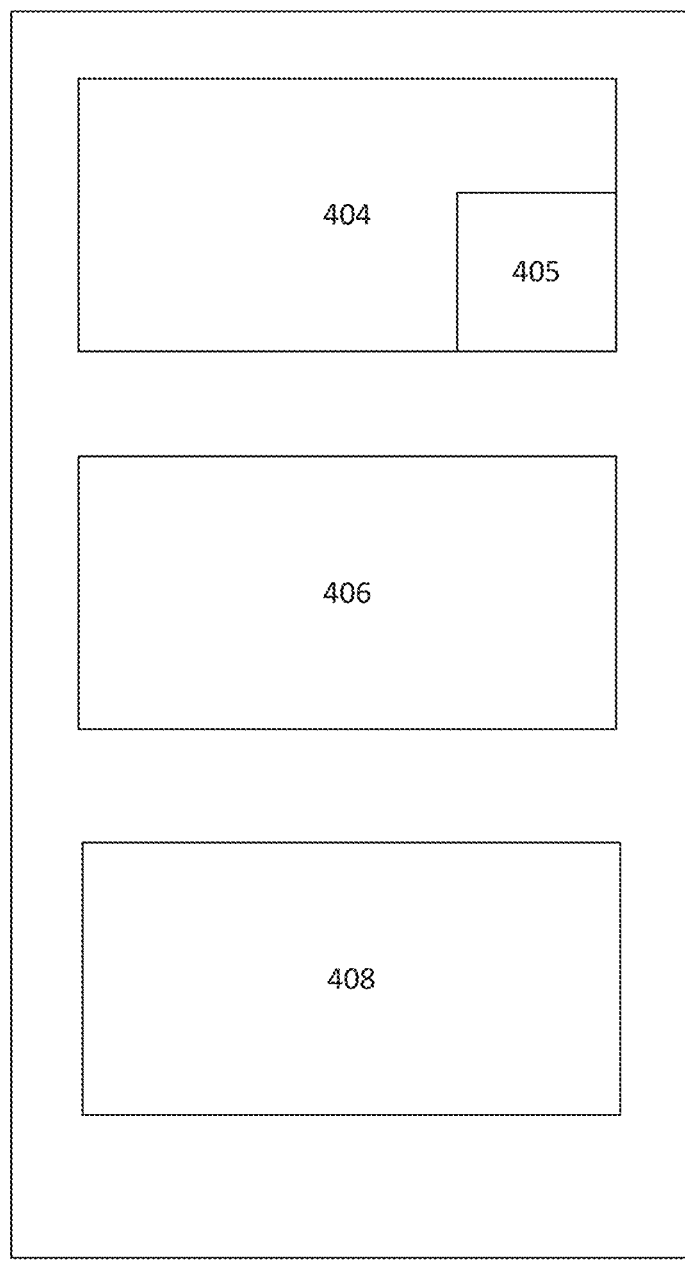
FIG. 4 depicts a robot, according to an aspect of the disclosure.

FIG. 4 depicts a robot 402, including a resource sharing circuit 404, configured to operate according to a resource utilization limit, the resource sharing circuit including a processor 405, configured to: receive resource data representing a resource utilization of the robot; if the resource utilization of the robot is within a predetermined range, operate according to a first operational mode, wherein an upper limit of the predetermined range is defined by a tolerance relative to the resource utilization limit; if the resource utilization of the robot is outside of the predetermined range, operate according to a second operational mode; wherein the first operational mode includes controlling a communication circuit 406 to send a first wireless signal representing an availability to accept a task from an external device for processing by the robot; and wherein the second operational mode includes controlling the communication 406 circuit to send a second wireless signal representing an availability to allocate a task to an external device for remote processing. The robot may further including a telemetry circuit 408, which may be configured to receive sensor data and to determine a sensor usage. The telemetry circuit 408 may be configured to receive battery information (e.g., a voltage, current, a total charged having been emitted from the battery, etc.) and to determine a battery utilization and/or a remaining charge and/or a remaining duration of battery use.

Figure 5:
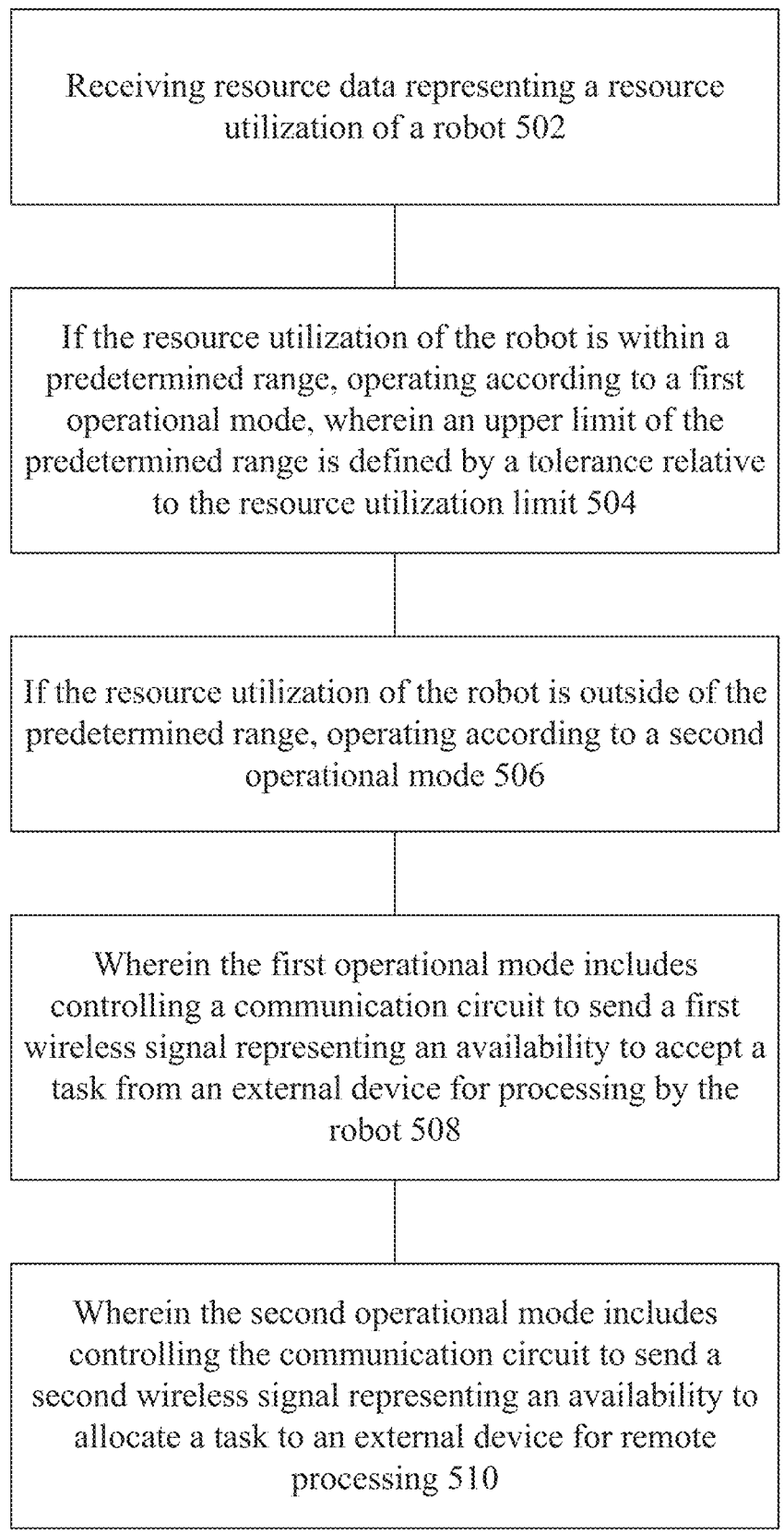
FIG. 5 depicts a method of task sharing.

FIG. 5 depicts a method of task sharing, including: receiving resource data representing a resource utilization of a robot; if the resource utilization of the robot is within a predetermined range, operating according to a first operational mode, wherein an upper limit of the predetermined range is defined by a tolerance relative to the resource utilization limit; if the resource utilization of the robot is outside of the predetermined range, operating according to a second operational mode; wherein the first operational mode includes controlling a communication circuit to send a first wireless signal representing an availability to accept a task from an external device for processing by the robot; and wherein the second operational mode includes controlling the communication circuit to send a second wireless signal representing an availability to allocate a task to an external device for remote processing.

The AMR may be configured to receive resource data representing a resource utilization of the robot. This data may be received from any source. According to one aspect of the disclosure, the AMR may include a telemetry circuit, which may receive information (e.g., signals, data, measurements, etc.) related to one or more sensors, one or more batteries, one or more processors, etc. The telemetry unit may provide the robot with resource data, which may be or be based from the information received by the telemetry circuit. This resource data may then indicate any extent of utilization of one or more resources (e.g. sensors, processors, batteries, etc.).

The AMR may include a resource sharing circuit, which may receive the resource data and analyze the resource data based on a task profile (e.g. the predetermined range). If the resource sharing circuit determines from the resource data that the resource is being used within the predetermined range, then it may operate the AMR according to a first operational mode. In this manner, the predetermined range may be understood as having an upper limit that is defined by a tolerance relative to the resource utilization limit. In other words, the resource sharing circuit may be configured to operate according to the first operational mode when the resource utilization is at or less than the upper limit (e.g. tolerance is zero) or alternatively when the resource utilization is at or below the upper limit less the tolerance. If the resource utilization of the robot is outside of the predetermined range, the resource sharing circuit may be configured to operate according to a second operational mode.

The first and the second operational modes will now be explained. In the first operational mode, the resource sharing circuit may control a communication circuit to send a first wireless signal representing an availability to accept a task from an external device for processing by the robot. In other words, when the resource utilization is beneath the upper limit of the threshold less the tolerance, the robot has available resources to accept a task. In this manner, the robot may advertise its services in accepting and performing an offloaded task.

In the second operational mode, the resource sharing circuit may control the communication circuit to send a second wireless signal representing an availability to allocate a task to an external device for remote processing. In other words, if the resource sharing circuit determines that the resource utilization is greater than an upper threshold less the tolerance, then the resource sharing circuit may determine that offloading is required or desirable. In this manner, the resource sharing circuit may seek to offload a task. This may be achieved by receiving one or more service advertisements from one or more other devices and arranging with one such device to offload a corresponding task to the device (e.g., accepting an offer of service). Alternatively or additionally, the robot may send a request for a device to be offloaded to another device.

According to an aspect of the disclosure, an AMR may send any signal in a secured or unsecured format. That is, the signal may be encrypted, such that only devices with a key may decode the signal. The system may be designed such that only devices within a given group ID possess the requisite key. In this manner, messages may be broadcast but then only decided by intended or authorized devices. Alternatively or additionally, signals may be send in an unencrypted format. In this manner, the signals may be readily understandable by any receiving device.

Although publishing of services (e.g. listing services that the device can perform) and subscribing of services (e.g. agreeing to offload a task to a publishing device) is generally described herein in terms of an AMR subscribing to a service of an external device (e.g., another AMR, a server, a cloud server, a station/PC, etc.), an external server may under some circumstances be a subscriber. For example, it may be possible that an external server seeks to collect data on operating conditions or algorithm effectiveness from one or more AMRs, such as, for example, for workflow management or to augment the effectiveness of another service. In this manner, the external server may receive one or more published services, for example, of one or more AMRs. The external server may then subscribe to these one or more services and then receive the results.

Further aspect of the disclosure will be shown by way of example:

In Example 1, A robot, including: a resource sharing circuit, configured to operate according to a resource utilization limit, the resource sharing circuit including a processor, configured to: receive resource data representing a resource utilization of the robot; if the resource utilization of the robot is within a predetermined range, operate according to a first operational mode, wherein an upper limit of the predetermined range is defined by a tolerance relative to the resource utilization limit; if the resource utilization of the robot is outside of the predetermined range, operate according to a second operational mode; wherein the first operational mode includes controlling a communication circuit to send a first wireless signal representing an availability to accept a task from an external device for processing by the robot; and wherein the second operational mode includes controlling the communication circuit to send a second wireless signal representing an availability to allocate a task to an external device for remote processing.

In Example 2, the robot of Example 1, wherein the resource data represent a utilization by the robot of any of a sensor, a processor, a motor, or any combination thereof.

In Example 3, the robot of Example 1 or 2, wherein the resource utilization limit represents a maximum permitted utilization of any of a sensor, a processor, a motor, or any combination thereof.

In Example 4, the robot of any one of Examples 1 to 3, wherein the tolerance is an estimated resource utilization for performance of the task.

In Example 5, the robot of Example 4, wherein the upper limit of the predetermined range is the resource utilization limit minus the tolerance.

In Example 6, the robot of any one of Examples 1 to 3, wherein the tolerance is a fixed number.

In Example 7, the robot of any one of Examples 1 to 3, wherein the tolerance is zero.

In Example 8, the robot of any one of Examples 1 to 7, wherein, in the first operational mode, the resource sharing circuit is configured to receive from the communication circuit a signal representing a task allocation from an external device, and wherein the processor is configured to perform the allocated task from the external device and to control the communication circuit to send a result of the performance of the allocated task to the external device.

In Example 9, the robot of any one of Examples 1 to 8, wherein, in the first operational mode: the resource sharing circuit is configured to receive from the communication circuit a signal representing a task from an external device; and the processor is configured to perform the task from the external device, control a sensor to perform the task from the external device, control a motor to perform the task from the external device, or any combination thereof, and to control the communication circuit to send a result of the performed task to the external device.

In Example 10, the robot of any one of Examples 1 to 9, wherein, in the second operational mode: the resource sharing circuit is configured to receive from the communication circuit a signal from the external device representing an availability of the external device to perform a task, and wherein the processor is configured to control the communication circuit to send a signal representing the task for remote performance.

In Example 11, the robot of any one of Examples 1 to 10, wherein, in the second operational mode: the resource sharing circuit is configured to receive from the communication circuit a signal from the external device representing a result of the task for remote performance.

In Example 12, the robot of any one of Examples 1 to 11, further including a task profile selection circuit, including a processor, configured to select a task profile from a plurality of predetermined task profiles, wherein the task profile includes the resource utilization limit.

In Example 13, the robot of Example 12, wherein the processor of the task profile section circuit is configured to select the task profile based on group membership of the robot, a task assigned to the robot, a sensor functionality of the robot; a sensor utilization of the robot; a processor capacity of the robot, a processor utilization of the robot, or any combination thereof.

In Example 14, the robot of Example 12 or 13, wherein the task profile circuit includes a neural network, configured to select the task profile from a plurality of predetermined task profiles.

In Example 15, the robot of Example 14, wherein the neural network is configured to select the task profile based on group membership of the robot, a task assigned to the robot, a sensor functionality of the robot; a sensor utilization of the robot; a processor capacity of the robot, a processor utilization of the robot, or any combination thereof.

In Example 16, the robot of any one of Examples 1 to 12, wherein the first wireless signal includes data representing the task profile.

In Example 17, the robot of any one of Examples 1 to 16, wherein the first wireless signal includes data representing an action performable by the robot for the external device.

In Example 18, the robot of any one of Examples 1 to 17, wherein sending the first wireless signal in the first operational mode includes broadcasting the first wireless data.

In Example 19, the robot of any one of Examples 1 to 18, wherein sending the first wireless signal in the first operational mode includes sending a point-to-point transmission to the external device.

In Example 20, the robot of any one of Examples 1 to 19, wherein sending the second wireless signal in the second operational mode includes broadcasting the second wireless data.

In Example 21, the robot of any one of Examples 1 to 20, wherein sending the second wireless signal in the second operational mode includes sending a point-to-point transmission to the external device.

In Example 22, the robot of any one of Examples 1 to 21, wherein controlling the communication circuit includes controlling the communication circuit to send according to "The Robot Operating System 2" (ROS 2).

In Example 23, the robot of Example 22, wherein the processor is configured to control the communication circuit in the first operation mode to send the first wireless signal according to an ROS 2 service type.

In Example 24, the robot of Example 23, wherein the ROS 2 service type is EXT:Service_UUID.

In Example 25, the robot of any one of Examples 22 to 24, wherein the processor is configured to control the communication circuit in the second operation mode to send a signal representing the task for remote performance according to an ROS 2 action type.

In Example 26, the robot of Example 25, wherein the ROS 2 action type is EXT_Actions.

In Example 27, the robot of any one of Examples 1 to 26, wherein the one or more processors are further configured to verify trust data from the external device.

In Example 28, the robot of Example 27, wherein the one or more processors are further configured, in the case that trust data are not verified, not to send the first wireless signal or the second wireless signal.

In Example 29, the robot of Example 27 or 28, wherein the one or more processors are further configured to perform a trust establishment protocol with the external device, and wherein the one or more processors are configured to send the first wireless signal or the second wireless signal only after establishing trust with the external device according to the trust establishment protocol.

In Example 30, a method of task sharing, including: receiving resource data representing a resource utilization of a robot; if the resource utilization of the robot is within a predetermined range, operating according to a first operational mode, wherein an upper limit of the predetermined range is defined by a tolerance relative to the resource utilization limit; if the resource utilization of the robot is outside of the predetermined range, operating according to a second operational mode; wherein the first operational mode includes controlling a communication circuit to send a first wireless signal representing an availability to accept a task from an external device for processing by the robot; and wherein the second operational mode includes controlling the communication circuit to send a second wireless signal representing an availability to allocate a task to an external device for remote processing.

In Example 31, the method of task sharing of Example 30, wherein the resource data represent a utilization of any of a sensor, a processor, a motor, or any combination thereof.

In Example 32, the method of task sharing of Example 30 or 31, wherein the resource utilization limit represents a maximum permitted utilization of any of a sensor, a processor, a motor, or any combination thereof.

In Example 33, the method of task sharing of any one of Examples 30 to 32, wherein the tolerance is an estimated resource utilization for performance of the task.

In Example 34, the method of task sharing of Example 33, wherein the upper limit of the predetermined range is the resource utilization limit minus the tolerance.

In Example 35, the method of task sharing of any one of Examples 30 to 32, wherein the tolerance is a fixed number.

In Example 36, the method of task sharing of any one of Examples 30 to 32, wherein the tolerance is zero.

In Example 37, the method of task sharing of any one of Examples 30 to 36, wherein, in the first operational mode, further including receiving from the communication circuit a signal representing a task allocation from an external device, and performing the allocated task from the external device and controlling a communication circuit to send a result of the performance of the allocated task to the external device.

In Example 38, the method of task sharing of any one of Examples 30 to 37, wherein, in the first operational mode, further including: receiving from the communication circuit a signal representing a task from an external device; and performing the task from the external device, controlling a sensor to perform the task from the external device, controlling a motor to perform the task from the external device, or any combination thereof, and controlling a communication circuit to send a result of the performed task to the external device.

In Example 39, the method of task sharing of any one of Examples 30 to 38, wherein, in the second operational mode, further including: receiving from the communication circuit a signal from the external device representing an availability of the external device to perform a task, and controlling the communication circuit to send a signal representing the task for remote performance.

In Example 40, the method of task sharing of any one of Examples 30 to 39, wherein, in the second operational mode: receiving from the communication circuit a signal from the external device representing a result of the task for remote performance.

In Example 41, the method of task sharing of any one of Examples 30 to 40, further including selecting a task profile from a plurality of predetermined task profiles, wherein the task profile includes the resource utilization limit.

In Example 42, the method of task sharing of Example 41, wherein selecting the task profile includes selecting the task profile based on group membership of the robot, a task assigned to the robot, a sensor functionality of the robot; a sensor utilization of the robot; a processor capacity of the robot, a processor utilization of the robot, or any combination thereof.

In Example 43, the method of task sharing of Example 41 or 42, wherein selecting the task profile includes selecting the task profile from a plurality of predetermined task profiles using a neural network.

In Example 44, the method of task sharing of Example 43, wherein the neural network is configured to select the task profile based on group membership of the robot, a task assigned to the robot, a sensor functionality of the robot; a sensor utilization of the robot; a processor capacity of the robot, a processor utilization of the robot, or any combination thereof.

In Example 45, the method of task sharing of any one of Examples 30 to 41, wherein the first wireless signal includes data representing the task profile.

In Example 46, the method of task sharing of any one of Examples 30 to 45, wherein the first wireless signal includes data representing an action performable by the robot for the external device.

In Example 47, the method of task sharing of any one of Examples 30 to 46, wherein sending the first wireless signal in the first operational mode includes broadcasting the first wireless data.

In Example 48, the method of task sharing of any one of Examples 30 to 47, wherein sending the first wireless signal in the first operational mode includes sending a point-to-point transmission to the external device.

In Example 49, the method of task sharing of any one of Examples 30 to 48, wherein sending the second wireless signal in the second operational mode includes broadcasting the second wireless data.

In Example 50, the method of task sharing of any one of Examples 30 to 49, wherein sending the second wireless signal in the second operational mode includes sending a point-to-point transmission to the external device.

In Example 51, the method of task sharing of any one of Examples 30 to 50, wherein controlling the communication circuit includes controlling the communication circuit to send according to "The Robot Operating System 2" (ROS 2).

In Example 52, the method of task sharing of Example 51, further including controlling the communication circuit in the first operation mode to send the first wireless signal according to an ROS 2 service type.

In Example 53, the method of task sharing of Example 52, wherein the ROS 2 service type is EXT: Service_UUID.

In Example 54, the method of task sharing of any one of Examples 51 to 53, further including controlling the communication circuit in the second operation mode to send a signal representing the task for remote performance according to an ROS 2 action type.

In Example 55, the method of task sharing of Example 54, wherein the ROS 2 action type is EXT_Actions.

In Example 56, the method of task sharing of any one of Examples 30 to 55, further including verifying trust data from the external device.

In Example 57, the method of task sharing of Example 56, further including, in the case that trust data are not verified, not to send the first wireless signal or the second wireless signal.

In Example 58, the method of task sharing of Example 56 or 57, further including performing a trust establishment protocol with the external device, and sending the first wireless signal or the second wireless signal only after establishing trust with the external device according to the trust establishment protocol.

In Example 59, a non-transitory computer readable medium is disclosed, including instructions which, if executed, cause one or more processors to perform any of Example 30 to 59.

In Example 60, a robot is disclosed, including a means for receiving resource data representing a resource utilization of a robot; a means for operating, if the resource utilization of the robot is within a predetermined range, according to a first operational mode, wherein an upper limit of the predetermined range is defined by a tolerance relative to the resource utilization limit; a means for operating, if the resource utilization of the robot is outside of the predetermined range, according to a second operational mode; wherein the first operational mode includes controlling a communication circuit to send a first wireless signal representing an availability to accept a task from an external device for processing by the robot; and wherein the second operational mode includes controlling the communication circuit to send a second wireless signal representing an availability to allocate a task to an external device for remote processing.

In Example 61, the robot of example 60 is disclosed, further including a means for performing any method disclosed in examples 30 through 58.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A robot, comprising:
   a resource sharing circuit, configured to operate according to a resource utilization limit according to a first task profile, the resource sharing circuit comprising a processor, configured to:
   send the first task profile to one or more other robots, wherein the first task profile represents a utilization threshold for one or more internal modules of the robot;
   receive from the one or more other robots one or more second task profiles, wherein the second task profiles respectively represent a utilization threshold for one or more internal modules of the one or more other robots;
   receive resource data representing a resource utilization of the robot;
   if the resource utilization of the robot is within a predetermined range relative to the first task profile, operate according to a first operational mode, wherein the first operational mode comprises controlling a communication circuit to send a first wireless signal to at least one of the one or more other robots representing an availability to accept a task from one of the one or more other robots for processing by the robot, or to accept a task allocated by one of the one or more other robots;
   if the resource utilization of the robot is outside of the predetermined range relative to the first task profile, operate according to a second operational mode; and
   wherein the second operational mode comprises controlling the communication circuit to send a second wireless signal to at least one of the one or more other robots representing an availability to allocate a task to an external device for remote processing.

2. The robot of claim 1, wherein an upper limit of the predetermined range is defined by a tolerance relative to the resource utilization limit, and wherein the resource data represent a utilization by the robot of any of a sensor, a processor, a motor, or any combination thereof.

3. The robot of claim 1, wherein the resource utilization limit represents a maximum permitted utilization of any of a sensor, a processor, a motor, or any combination thereof.

4. The robot of claim 1, wherein the tolerance is an estimated resource utilization for performance of the task.

5. The robot of claim 4, wherein the upper limit of the predetermined range is a difference between the resource utilization limit and the tolerance.

6. The robot of claim 4, wherein the tolerance is a fixed number.

7. The robot of claim 1, wherein, in the first operational mode, the resource sharing circuit is configured to receive from the communication circuit a signal representing a task allocation from an external device, and wherein the processor is configured to perform a task of the allocated task from the external device and to control the communication circuit to send a result of the performance of the allocated task to the external device.

8. The robot of claim 1, wherein, in the first operational mode:
   the resource sharing circuit is configured to receive from the communication circuit a signal representing a task from an external device; and
   the processor is configured to perform the task from the external device, control a sensor to perform the task from the external device, control a motor to perform the task from the external device, or any combination thereof, and to control the communication circuit to send a result of the performed task to the external device.

9. The robot of claim 1, wherein, in the second operational mode:
   the resource sharing circuit is configured to receive from the communication circuit a signal from the external device representing an availability of the external device to perform a task, and wherein the processor is configured to control the communication circuit to send a signal representing the task for remote performance.

10. The robot of claim 1, wherein, in the second operational mode:
    the resource sharing circuit is configured to receive from the communication circuit a signal from the external device representing a result of the task for remote performance.

11. The robot of claim 1, further comprising a task profile selection circuit, comprising a processor, configured to select a task profile from a plurality of predetermined task profiles, wherein the task profile comprises the resource utilization limit.

12. The robot of claim 11, wherein the processor of the task profile section circuit is configured to select the task profile based on group membership of the robot, a task assigned to the robot, a sensor functionality of the robot; a sensor utilization of the robot; a processor capacity of the robot, a processor utilization of the robot, or any combination thereof.

13. The robot of claim 11, wherein the task profile selection circuit is configured to use a neural network, and wherein the neural network is configured to select the task profile from a plurality of predetermined task profiles.

14. The robot of claim 13, wherein the neural network is configured to select the task profile based on group membership of the robot, a task assigned to the robot, a sensor functionality of the robot; a sensor utilization of the robot; a processor capacity of the robot, a processor utilization of the robot, or any combination thereof.

15. The robot of claim 1 wherein the first wireless signal comprises data representing the task profile.

16. A non-transitory computer readable medium, comprising instructions which, if executed, cause a processor to:
  receive resource data representing a resource utilization of a robot according to a first task profile;
  control a transmitter to send the first task profile to one or more other robots, wherein the first task profile represents a utilization threshold for one or more internal modules of the robot;
  receive from the one or more other robots one or more second task profiles, wherein the second task profiles respectively represent a utilization threshold for one or more internal modules of the one or more other robots;
  operate, if the resource utilization of the robot is within a predetermined range, according to a first operational mode, wherein the first operational mode comprises controlling a communication circuit to send a first wireless signal to at least one of the one or more other robots representing an availability to accept a task from one of the one or more other robots for processing by the robot, or to accept a task allocated by one of the one or more other robots;
  operate, if the resource utilization of the robot is outside of the predetermined range, according to a second operational mode,
  wherein the second operational mode comprises controlling the communication circuit to send a second wireless signal to at least one of the one or more other robots representing an availability to allocate a task to an external device for remote processing.

17. The non-transitory computer readable medium of claim 16, wherein the resource data represent a utilization of any of a sensor, a processor, a motor, or any combination thereof.

18. The non-transitory computer readable medium of claim 16, wherein the resource utilization limit represents a maximum permitted utilization of any of a sensor, a processor, a motor, or any combination thereof.

19. The robot of claim 1, wherein the sending the second wireless signal to at least one of the one or more other robots representing an availability to allocate a task to an external device for remote processing comprises selecting a task-recipient robot of the one or more other robots based on a task-profile received from the task-recipient robot and offer a task to the task-recipient robot for offloading.

20. The robot of claim 1, wherein the one or more internal modules of the robot comprise any of processors, sensors, motors, or perception or data inference modules; and wherein the utilization threshold comprises an upper utilization limit for any of the internal modules.

* * * * *